US009805516B2

United States Patent
Liu et al.

(10) Patent No.: US 9,805,516 B2
(45) Date of Patent: Oct. 31, 2017

(54) 3D HOLOGRAPHIC VIRTUAL OBJECT DISPLAY CONTROLLING METHOD BASED ON HUMAN-EYE TRACKING

(71) Applicant: SHENZHEN ESTAR TECHNOLOGY GROUP CO., LTD., Shenzhen, Guangdong Province (CN)

(72) Inventors: Meihong Liu, Shenzhen (CN); Yihua Chen, Shenzhen (CN)

(73) Assignee: SHENZHEN MAGIC EYE TECHNOLOGY CO., LTD., Shenzhen, Guangdong Province (CN)

( * ) Notice: Subject to any disclaimer, the term of this patent is extended or adjusted under 35 U.S.C. 154(b) by 201 days.

(21) Appl. No.: 14/596,209

(22) Filed: Jan. 13, 2015

(65) Prior Publication Data
US 2016/0093113 A1    Mar. 31, 2016

(30) Foreign Application Priority Data
Sep. 30, 2014 (CN) .......................... 2014 1 0526246

(51) Int. Cl.
| | |
|---|---|
| G06T 19/20 | (2011.01) |
| G06F 3/01 | (2006.01) |
| G06F 3/0481 | (2013.01) |
| G06F 3/0484 | (2013.01) |
| H04N 13/00 | (2006.01) |
| H04N 13/02 | (2006.01) |
| H04N 13/04 | (2006.01) |

(52) U.S. Cl.
CPC .............. *G06T 19/20* (2013.01); *G06F 3/013* (2013.01); *G06F 3/04815* (2013.01); *G06F 3/04845* (2013.01); *H04N 13/0014* (2013.01); *H04N 13/0275* (2013.01); *H04N 13/0468* (2013.01); *H04N 13/0484* (2013.01); *G06F 2203/04806* (2013.01); *G06T 2219/2004* (2013.01); *G06T 2219/2016* (2013.01)

(58) Field of Classification Search
CPC ...... G06T 19/20; G06F 3/013; G06F 3/04845
See application file for complete search history.

(56) References Cited

U.S. PATENT DOCUMENTS

| | | | |
|---|---|---|---|
| 6,283,954 B1 * | 9/2001 | Yee ..................... | A61F 9/00804 351/210 |
| 2010/0182232 A1 * | 7/2010 | Zamoyski .............. | G06F 3/013 345/157 |
| 2011/0006978 A1 * | 1/2011 | Yuan ...................... | G06F 3/013 345/156 |

(Continued)

*Primary Examiner* — Nicholas Lee
*Assistant Examiner* — Robert Stone
(74) *Attorney, Agent, or Firm* — Cheng-Ju Chiang

(57) ABSTRACT

A 3D holographic virtual object display controlling method and apparatus based on human-eye tracking are provided. The display controlling method comprises the following steps of: activating tracking of human eyes of a user; tracking motions of eyeballs of the user; controlling a 3D holographic virtual object presented in a display interface to rotate in response to the motions of the eyeballs of the user; and ending up the tracking of the human eyes of the user. Thereby, the present disclosure can control rotation of a 3D holographic virtual object presented in a display interface by tracking eyeballs and in response to the motions of the eyeballs, which makes the operations convenient and easy.

10 Claims, 6 Drawing Sheets

(56) References Cited

U.S. PATENT DOCUMENTS

| | | | | |
|---|---|---|---|---|
| 2012/0105486 A1* | 5/2012 | Lankford | ................ | G06F 3/013 345/661 |
| 2013/0083976 A1* | 4/2013 | Ragland | ................. | G06F 3/011 382/117 |
| 2013/0293467 A1* | 11/2013 | Norden | ................. | G06F 3/0488 345/158 |
| 2013/0293488 A1* | 11/2013 | Na | ........................ | G06F 3/013 345/173 |
| 2014/0236260 A1* | 8/2014 | McDermott | ....... | A61N 1/36046 607/54 |
| 2014/0306878 A1* | 10/2014 | Bhakta | ................ | G02B 27/017 345/156 |
| 2014/0340305 A1* | 11/2014 | Seong | .................... | H03M 7/40 345/156 |
| 2015/0042558 A1* | 2/2015 | Massonneau | .......... | G06F 3/005 345/156 |
| 2016/0025971 A1* | 1/2016 | Crow | ................ | G02B 27/0093 345/156 |

\* cited by examiner

3D HOLOGRAPHIC VIRTUAL OBJECT DISPLAY CONTROLLING METHOD BASED ON HUMAN-EYE TRACKING

FIELD OF THE INVENTION

The present disclosure relates to the technical field of display controlling, and more particularly, to a three-dimensional (3D) holographic virtual object display controlling method based on human-eye tracking.

BACKGROUND OF THE INVENTION

Owing to the advancement of 3D technologies and holographic technologies, more and more virtual 3D holographic graphics are used in display interfaces, e.g., 3D engineering drawings, holographic images, 3D movies, 3D playing games and so on. Correspondingly, people often need to control rotation or scaling of the 3D graphics.

In the prior art, controlling of a virtual 3D holographic graphic in a display interface is usually accomplished by using a mouse or some other button to lock the virtual 3D holographic graphic and then moving the mouse or the button to control rotation of the virtual 3D holographic graphic, and control of the scaling of the virtual 3D holographic graphic is often accomplished by using the mouse wheel or some other button.

However, it is troublesome for people to execute other operations on the virtual 3D holographic graphic while the virtual 3D holographic graphic is rotated. For example, when a cube is to be colored, the cube must be rotated several times to color each side of the cube.

SUMMARY OF THE INVENTION

A main technical problem to be solved by the present disclosure is to control rotation of a 3D holographic virtual object presented in a display interface according to motions of eyeballs.

To solve the aforesaid technical problem, a technical solution adopted by the present disclosure is to provide a display controlling method based on human-eye tracking, which comprises the following steps of: activating tracking of human eyes of a user; tracking motions of eyeballs of the user; controlling a 3D holographic virtual object presented in a display interface to rotate in response to the motions of the eyeballs of the user; and ending up the tracking of the human eyes of the user.

Preferably, the step of activating tracking of human eyes of a user comprises: detecting an open/close state of eyelids of the user; activating the tracking of human eyes of the user if the open/close state of the eyelids of the user satisfies a first preset state; the step of ending up the tracking of the human eyes of the user comprises: detecting an open/close state of the eyelids of the user; ending up the tracking of the human eyes of the user if the open/close state of the eyelids of the user satisfies a second preset state.

Preferably, the first preset state and the second preset state are that a closing frequency of the eyelids of the user is higher than respective preset frequency thresholds.

Preferably, the first preset state and the second preset state are respectively at least one of the following: the left eyelid of the user is in the open state while the right eyelid of the user is in a closed state, or the left eyelid of the user is in the closed state while the right eyelid of the user is in the open state.

Preferably, the first preset state is one of the following: the left eyelid of the user is in the open state while the right eyelid of the user is in the closed state, or the left eyelid of the user is in the closed state while the right eyelid of the user is in the open state, and the second preset state is the other one of the following: the left eyelid of the user is in the open state while the right eyelid of the user is in the closed state, or the left eyelid of the user is in the closed state while the right eyelid of the user is in the open state.

Preferably, the step of tracking motions of eyeballs of the user comprises: acquiring a human-face image of the user; identifying human-eye regions on the human-face image; identifying a sclerotic region and an iris region in each of the human-eye regions according to the color contrast; and tracking eyeball motions of the user according to changes in position of the iris region relative to the human-eye region.

Preferably, the step of identifying a sclerotic region and an iris region in each of the human-eye regions according to the color contrast further comprises: determining a center connection line of centers of the iris region of the left eye and the iris region of the right eye of the user; the step of controlling a 3D holographic virtual object presented in a display interface to rotate in response to the motions of the eyeballs of the user comprises: rotating the 3D holographic virtual object about a rotation axis that is located at a barycenter of the 3D holographic virtual object and perpendicular to the center connection line.

Preferably, the step of tracking motions of eyeballs of the user further comprises: detecting an area of the eyeball that is not covered by the eyelid of the user; the step of controlling a 3D holographic virtual object presented in a display interface to rotate in response to the motions of the eyeballs of the user comprises: scaling the 3D holographic virtual object according to changes in the area of the eyeball that is not covered by the eyelid of the user.

Preferably, the step of scaling the 3D holographic virtual object according to changes in the area of the eyeball that is not covered by the eyelid of the user comprises: decreasing a distance between the 3D holographic virtual object and the user when the area of the eyeball that is not covered by the eyelid of the user becomes smaller; increasing the distance between the 3D holographic virtual object and the user when the area of the eyeball that is not covered by the eyelid of the user becomes greater.

Preferably, the step of tracking motions of eyeballs of the user comprises: counting closing actions of the eyelids of the user during the process of tracking motions of the eyeballs of the user; if a close action of the eyelids of the user is a closing action for the first time, then suspending the step of controlling a 3D holographic virtual object presented in a display interface to rotate in response to the motions of the eyeballs of the user, and waiting for returning of the eyeball of the user; if a close action of the eyelid of the user is a closing action for the second time, then restarting the step of controlling a 3D holographic virtual object presented in a display interface to rotate in response to the motions of the eyeballs of the user, and clearing the count value of the closing actions of the eyelids of the user.

To solve the aforesaid technical problem, another technical solution adopted by the present disclosure is to provide a display controlling apparatus based on human-eye tracking, which comprises: an activating unit, being configured to activate tracking of human eyes of a user; a tracking unit, being configured to track motions of eyeballs of the user; a controlling unit, being configured to control a 3D holographic virtual object presented in a display interface to rotate in response to the motions of the eyeballs of the user;

and a closing unit, being configured to end up the tracking of the human eyes of the user.

To solve the aforesaid technical problem, yet another technical solution adopted by the present disclosure is to provide a display controlling apparatus based on human-eye tracking, which comprises a non-transitory program storage medium and a processor, the non-transitory program storage medium stores a program executed by the processor to perform a method which comprises: activating tracking of human eyes of a user; tracking motions of eyeballs of the user; controlling a 3D holographic virtual object presented in a display interface to rotate in response to the motions of the eyeballs of the user; and ending up the tracking of the human eyes of the user.

Preferably, the step of activating tracking of human eyes of a user in the method performed by the processor, comprises: detecting an open/close state of eyelids of the user; activating the tracking of human eyes of the user if the open/close state of the eyelids of the user satisfies a first preset state; the step of ending up the tracking of the human eyes of the user comprises: detecting an open/close state of the eyelids of the user; and ending up the tracking of the human eyes of the user if the open/close state of the eyelids of the user satisfies a second preset state.

Preferably, the first preset state and the second preset state are that a closing frequency of the eyelids of the user is higher than respective preset frequency thresholds.

Preferably, the first preset state and the second preset state are respectively at least one of the following: the left eyelid of the user is in the open state while the right eyelid of the user is in a closed state, or the left eyelid of the user is in the closed state while the right eyelid of the user is in the open state.

Preferably, the step of tracking motions of eyeballs of the user in the method performed by the processor, comprises: acquiring a human-face image of the user; identifying human-eye regions on the human-face image; identifying a sclerotic region and an iris region in each of the human-eye regions according to the color contrast; and tracking eyeball motions of the user according to changes in position of the iris region relative to the human-eye region.

Preferably, the step of identifying a sclerotic region and an iris region in each of the human-eye regions according to the color contrast further comprises: determining a center connection line of centers of the iris region of the left eye and the iris region of the right eye of the user; the step of controlling a 3D holographic virtual object presented in a display interface to rotate in response to the motions of the eyeballs of the user comprises: rotating the 3D holographic virtual object about a rotation axis that is located at a barycenter of the 3D holographic virtual object and perpendicular to the center connection line.

Preferably, the step of tracking motions of eyeballs of the user in the method preformed by the processor, further comprises: detecting an area of the eyeball that is not covered by the eyelid of the user; the step of controlling a 3D holographic virtual object presented in a display interface to rotate in response to the motions of the eyeballs of the user comprises: scaling the 3D holographic virtual object according to changes in the area of the eyeball that is not covered by the eyelid of the user.

Preferably, the step of scaling the 3D holographic virtual object according to changes in the area of the eyeball that is not covered by the eyelid of the user comprises: decreasing a distance between the 3D holographic virtual object and the user when the area of the eyeball that is not covered by the eyelid of the user becomes smaller; and increasing the distance between the 3D holographic virtual object and the user when the area of the eyeball that is not covered by the eyelid of the user becomes greater.

Preferably, the step of tracking motions of eyeballs of the user in the method performed by the processor, comprises: counting closing actions of the eyelids of the user during the process of tracking motions of the eyeballs of the user; if a close action of the eyelids of the user is a closing action for the first time, then suspending the step of controlling a 3D holographic virtual object presented in a display interface to rotate in response to the motions of the eyeballs of the user, and waiting for returning of the eyeball of the user; and if a close action of the eyelid of the user is a closing action for the second time, then restarting the step of controlling a 3D holographic virtual object presented in a display interface to rotate in response to the motions of the eyeballs of the user, and clearing the count value of the closing actions of the eyelids of the user.

The present disclosure has the following benefits: as compared to the prior art, the present disclosure makes control of rotation of the 3D holographic object in the display interface more convenient and faster by activating tracking of human eyes of a user; tracking motions of eyeballs of the user; and controlling a 3D holographic virtual object presented in the display interface to rotate in response to the motions of the eyeballs of the user.

DETAILED DESCRIPTION OF THE INVENTION

Figure 1:
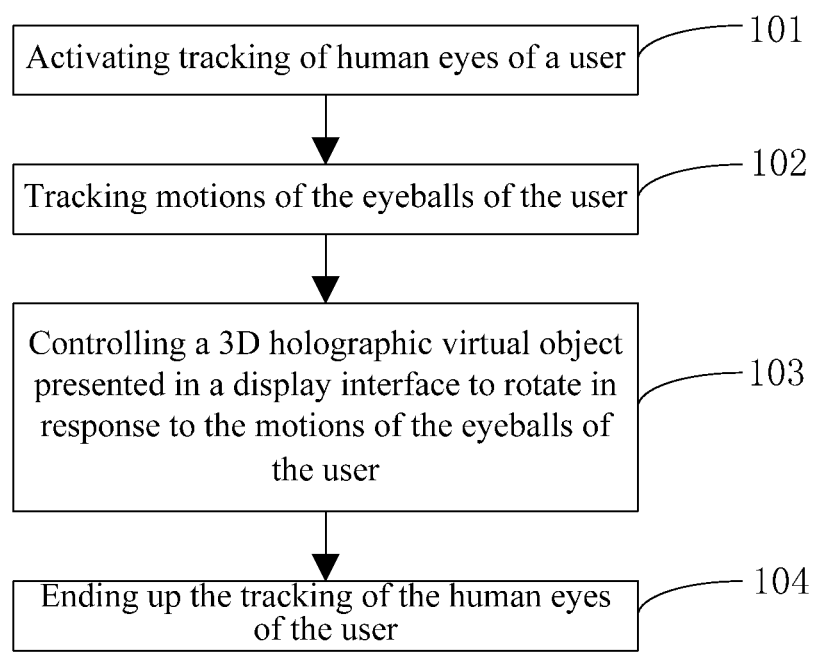
FIG. 1 is a flowchart diagram of a display controlling method based on human-eye tracking according to a first embodiment of the present disclosure.

Referring to FIG. 1, there is shown a flowchart diagram of a display controlling method based on human-eye tracking according to a first embodiment of the present disclosure, which comprises the following steps of:

Step 101: activating tracking of human eyes of a user.

The tracking of the human eyes of the user may be activated by an input instruction of the user, for example, by inputting a certain command through a keyboard or by clicking a certain button through a mouse; or be activated by detecting a certain specific action of the body of the user, for example, a certain specific action of eyeballs.

Step 102: tracking motions of the eyeballs of the user.

The tracking of the eyeballs of the user may be achieved by detecting the motions of the eyeballs by a camera, for example, by detecting motion of a pupil which is taken as a center point by the camera; or by detecting the ratio of the iris and the ratio of the sclera in an eyeball; and furthermore, the tracking of the eyeballs may also be performed by a pair of special 3D glasses or other devices in addition to the camera.

Step 103: controlling a 3D holographic virtual object presented in a display interface to rotate in response to the motions of the eyeballs of the user.

The 3D holographic object is generally an object in an engineering 3D drawing, and may also be a character in a 3D photo or a 3D playing game or other 3D virtual objects. The rotating mode is to determine a moving direction of the 3D object according to the moving direction of the eyeball. For example, when the eyeballs move towards the left, it is determined that the user wants to see the content in the farther left of the object and, thus, the 3D virtual object is rotated towards the right.

Step 104: ending up the tracking of the human eyes of the user.

The tracking of the human eyes of the user may be ended up in a way corresponding to that used to activate the tracking of the human eyes of the user.

As compared to the prior art, this embodiment makes control of rotation of the 3D holographic object in the display interface more convenient and faster by activating tracking of the human eyes of the user through detecting an open/close state of eyelids of the user; and controlling the 3D virtual object presented in the display interface to rotate in response to the motions of the eyeballs of the user.

Figure 2:
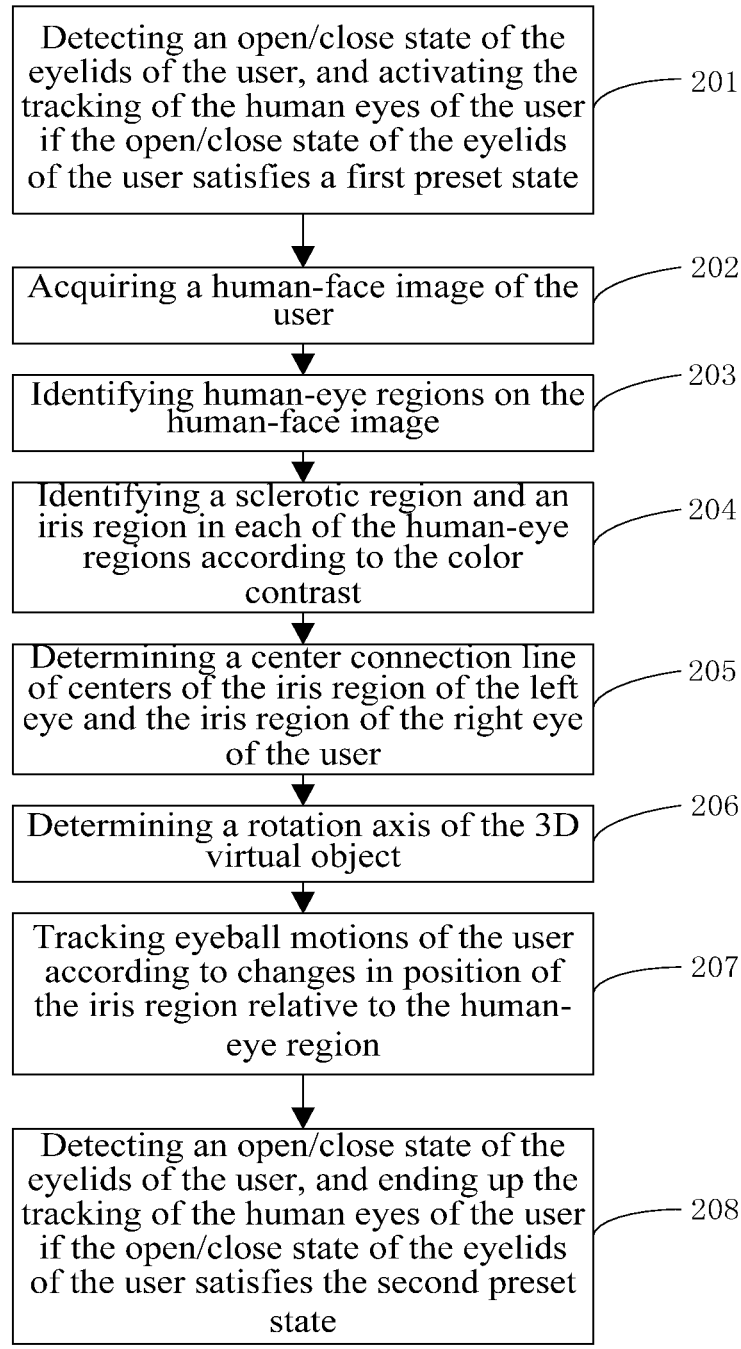
FIG. 2 is a flowchart diagram of a display controlling method based on human-eye tracking according to a second embodiment of the present disclosure.

Referring to FIG. 2, there is shown a flowchart diagram of a display controlling method based on human-eye tracking according to a second embodiment of the present disclosure. The display controlling method based on human-eye tracking disclosed in this embodiment will be detailed on the basis of the display controlling method based on human-eye tracking disclosed in the first embodiment. The method disclosed in this embodiment comprises:

Step 201: detecting an open/close state of the eyelids of the user, and activating the tracking of the human eyes of the user if the open/close state of the eyelids of the user satisfies a first preset state.

The way in which the eyelids of the user are detected is similar to that in the first embodiment of the present disclosure. The eye regions present different colors when the human eyelids are in the open/close state respectively, so the open/close state of the eyelids can be determined according to the color of the eye regions of the human face.

The first preset state may be that a frequency of the eyelids is higher than a preset frequency threshold. Because a closing frequency of the eyelids of the human eye is normally relatively low, the closing frequency of the eyelids of the first preset state may be set to be a relatively high frequency; for example, the first preset state is satisfied when the closing frequency of the eyelids close is once per second.

The first preset state may also be at least one of the following: the left eyelid of the user is in the open state while the right eyelid of the user is in a closed state, or the left eyelid of the user is in the closed state while the right eyelid of the user is in the open state. For example, the first preset state is that the left eyelid of the user is in the open state while the right eyelid of the user is in the closed state; and the tracking of the human eyes of the user is activated if the left eyelid of the user is in the open state while the right eyelid of the user is in the closed state.

Step 202: acquiring a human-face image of the user.

This step is suitable for cases where apparatuses such as a camera and etc. that can identify the human face are used to acquire the human-face image, and on the other hand, apparatuses such as 3D glasses and etc. can acquire human-eye regions simply through special apparatuses on the glasses.

Step 203: identifying the human-eye regions on the human-face image.

Because the color of the human eyes significantly differs from the color of the skin, the human-eye regions on the human-face image can be identified only through a simple image processing.

Step 204: identifying a sclerotic region and an iris region in each of the human-eye regions according to the color contrast.

Figure 3:
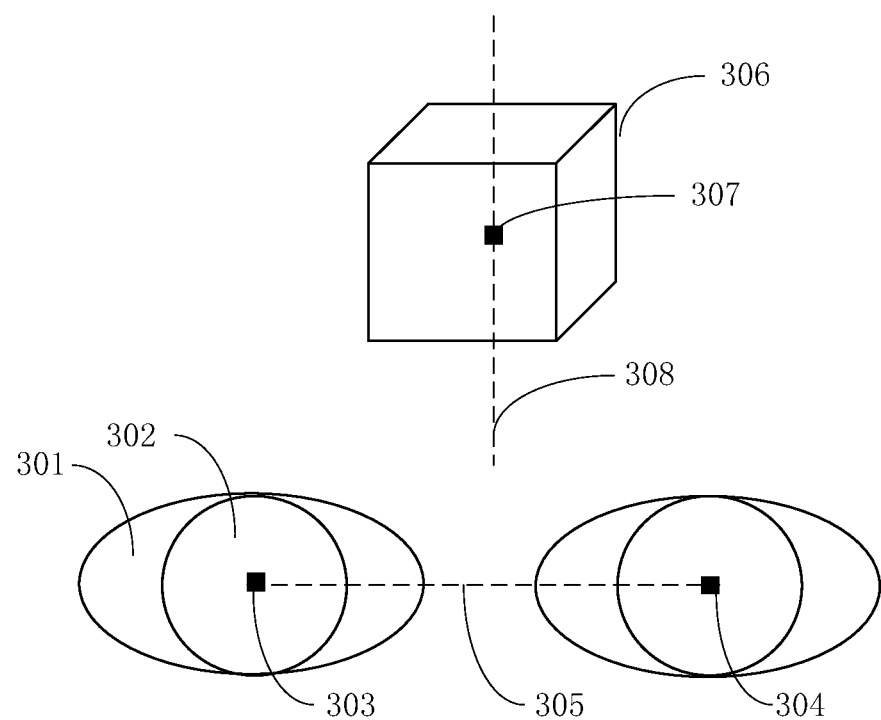
FIG. 3 is a schematic view illustrating eyeballs and a 3D holographic virtual object in FIG. 2.

As shown in FIG. 3, the surface of the human-eye region comprises a sclerotic region 301 and an iris region 302. The sclerotic region 301 is white while the iris region 302 is black, so the sclerotic region 301 and the iris region 302 can be easily identified according to the color contrast.

Step 205: determining a center connection line of centers of the iris region of the left eye and the iris region of the right eye of the user;

A center point 303 of the iris region of the left eye and a center point 304 of the iris region of the right eye are respectively determined (the "left" and the "right" described in the embodiment are respectively the left direction and the right direction that are perceived by the user), and the center point 303 and the center point 304 are connected to form a center connection line 305.

Step 206: determining a rotation axis of the 3D holographic virtual object and rotating the 3D holographic virtual object about the rotation axis.

The rotation axis 308 passes a barycenter 307 of a 3D holographic virtual object 306 and is perpendicular to the center connection line 305 in the step 205. That is, the rotation axis 308 is perpendicular to the center connection line 305 and the 3D holographic virtual object 306 is rotated about the rotation axis 308.

Step 207: tracking eyeball motions of the user according to changes in position of the iris region relative to the human-eye region.

Figure 4:
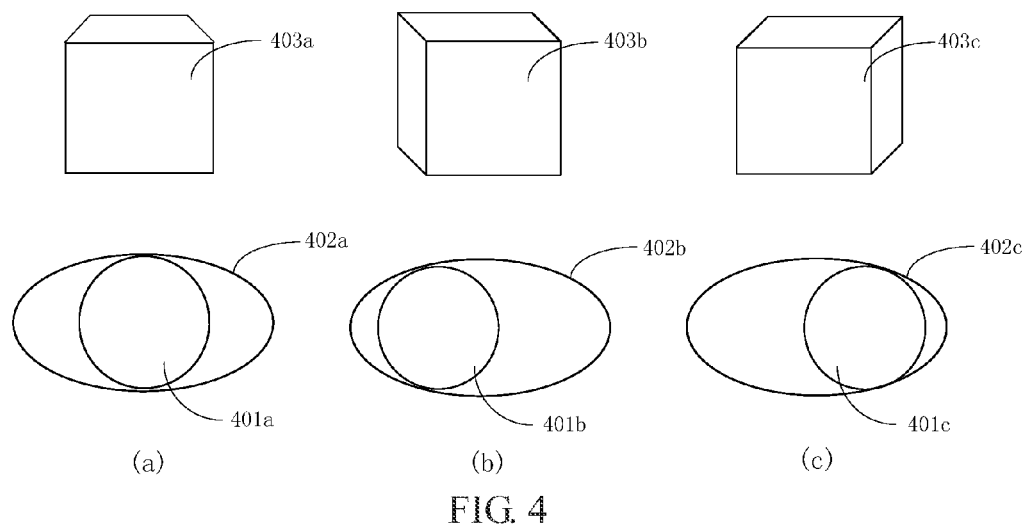
FIG. 4 is a schematic view illustrating a process of controlling a 3D holographic virtual object to rotate in response to the eyeballs in FIG. 2.

As shown in FIG. 4, when an iris region 401*a* is at the center of a human-eye region 402*a*, a 3D holographic virtual object 403*a* remains still; when the iris region 401*b* is in the left portion of a human-eye region 402*b*, it represents that the user prefers to see the left side of a virtual object 403*b* and the 3D holographic virtual object 403*b* is rotated towards the right; and when an iris region 401*c* is in the right portion of a human-eye region 402*c*, it represents that the user prefers to see the right side of a virtual object 403*c* and the 3D holographic virtual object 403*c* is rotated towards the left.

Furthermore, during the process of tracking in response to the motions of the eyeballs of the user, closing actions of the eyelids of the user are counted. If a close action of the eyelids of the user is a closing action for the first time, then the step of controlling a 3D holographic virtual object presented in a display interface to rotate in response to the motions of the eyeballs of the user is suspended to wait for returning of the eyeball of the user; and if a close action of the eyelids of the user is a closing action for the second time, then the step of controlling a 3D holographic virtual object presented in a display interface to rotate in response to the motions of the eyeballs of the user is restarted, and the count value of the closing actions of the eyelids of the user is cleared.

Step 208: detecting an open/close state of the eyelids of the user, and ending up the tracking of the human eyes of the user if the open/close state of the eyelids of the user satisfies the second preset state.

The way in which this step is executed is similar to that of the step 201.

The second preset state may be that the frequency of the eyelids is higher than the preset frequency threshold. Because a closing frequency of the eyelids of the human eye is normally relatively low, the closing frequency of the eyelids of the second preset state is set to be a relatively high frequency that is different from the closing frequency of the eyelids of the first preset state. For example, the second preset state is satisfied when the closing frequency of the eyelids close is twice per second.

The second preset state may also be at least one of the following: the left eyelid of the user is in the open state while the right eyelid of the user is in the closed state, or the left eyelid of the user is in the closed state while the right eyelid of the user is in the open state. For example, the second preset state is that the left eyelid of the user is in the closed state while the right eyelid of the user is in the open state; and the tracking of the human eyes of the user is ended up if the left eyelid of the user is in the closed state while the right eyelid of the user is in the open state.

As compared to the prior art, this embodiment controls the rotation of the 3D holographic virtual object in the display interface by detecting the positions of the sclera and the iris in the human eyeballs to determine the moving direction of the human eyeballs. Thereby, the user can perform other operations at the same time, which makes the operations more convenient and faster and improves the user's experiences.

Figure 5:
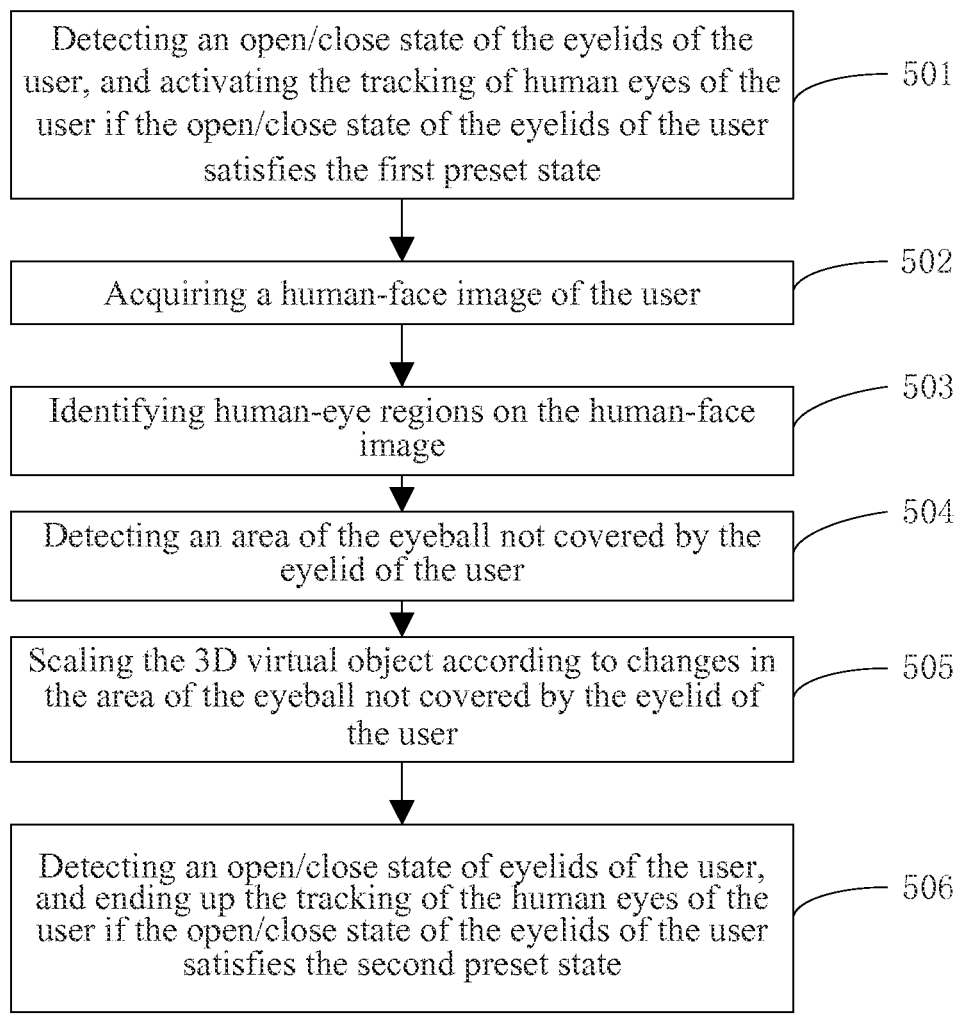
FIG. 5 is a flowchart diagram of a display controlling method based on human-eye tracking according to a third embodiment of the present disclosure.

Referring to FIG. 5, there is shown a flowchart diagram of a display controlling method based on human-eye tracking according to a third embodiment of the present disclosure. The display controlling method based on human-eye tracking disclosed in this embodiment will be detailed on the basis of the display controlling method based on human-eye tracking disclosed in the first embodiment. The method disclosed in this embodiment comprises:

Step 501: detecting an open/close state of the eyelids of the user, and activating the tracking of the human eyes of the user if the open/close state of the eyelids of the user satisfies the first preset state.

Step 502: acquiring a human-face image of the user.

Step 503: identifying human-eye regions on the human-face image.

The steps 501~503 are the same as those in the second embodiment of the present disclosure, so they will not be further described herein.

Step 504: detecting an area of the eyeball that is not covered by the eyelid of the user.

The user may control the area of the eyeball that is covered by the eyelid by moving the eyelid, for example, by opening his or her eyes wide open and narrowing his or her eyes.

Step 505: scaling the 3D holographic virtual object according to changes in the area of the eyeball that is not covered by the eyelid of the user.

Figure 6:
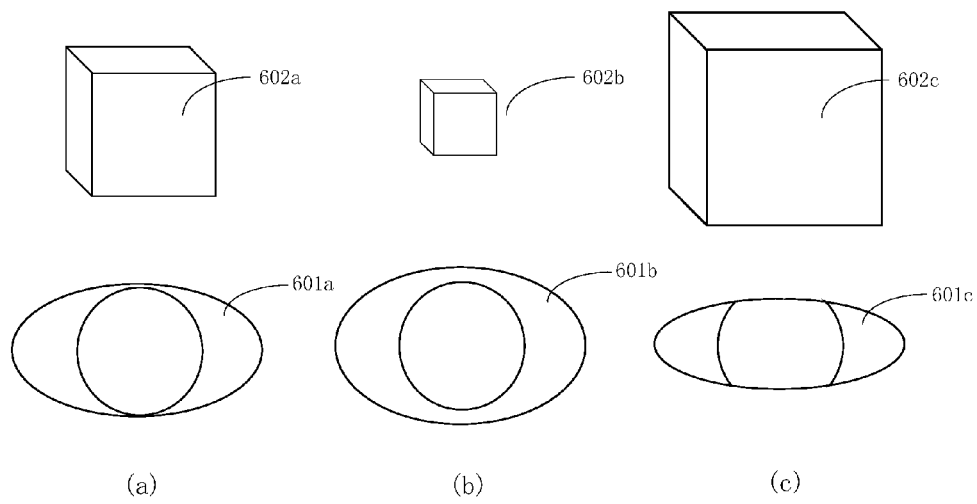
FIG. 6 is a schematic view illustrating a process of controlling scaling of a 3D holographic virtual object in response to eyeballs in FIG. 5.

As shown in FIG. 6, a distance between a 3D holographic virtual object 602b and the user is increased when an area 601b of the eyeball that is not covered by the eyelid of the user becomes greater; and a distance between a 3D holographic virtual object 602c and the user is decreased when an area 601c of the eyeball that is not covered by the eyelid of the user becomes smaller.

Step 506: detecting an open/close state of the eyelids of the user, and ending up the tracking of the human eyes of the user if the open/close state of the eyelids of the user satisfies the second preset state.

As compared to the prior art, this embodiment controls scaling of the 3D holographic virtual object in the display interface according to the area of the human eyeballs that is not covered by the eyelids. Thereby, the user can perform other operations at the same time, which makes the operations convenient and fast and improves the experiences of the user.

Furthermore, the technical solutions of rotating and scaling the 3D holographic virtual object respectively in the second embodiment and in the third embodiment of the present disclosure may be two steps of a same embodiment, and this will not be further described herein.

Figure 7:
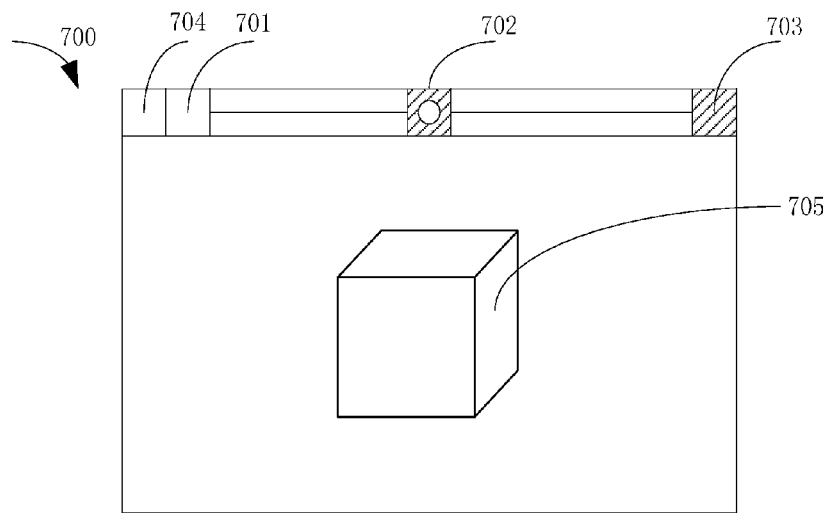
FIG. 7 is a schematic view illustrating a display controlling apparatus based on human-eye tracking according to a fourth embodiment of the present disclosure.

Referring to FIG. 7, there is shown a schematic view illustrating a display controlling apparatus based on human-eye tracking according to a fourth embodiment of the present disclosure. A display controlling apparatus 700 comprises: an activating unit 701, being configured to activate tracking of the human eyes of a user; a tracking unit 702, being configured to track motions of eyeballs of the user; a controlling unit 703, being configured to control a 3D holographic virtual object 705 presented in a display interface to rotate in response to the motions of the eyeballs of the user; and a closing unit 704, being configured to end up the tracking of the human eyes of the user.

The activating unit 701 and the closing unit 704 may be integrated in the display apparatus 700, or may be implemented in a mobile terminal for remote control by the user, or may be modules of the display apparatus 700 that accomplish the activating and closing operations according to information of the human eyes detected by the tracking unit 702.

The tracking unit 702 may be a camera integrated in the display apparatus 700 or an external camera, and may also be a pair of special 3D glasses or some other device.

The controlling unit 703 controls the virtual 3D holographic object 705 in the display interface to rotate according to the information of the eyeball motions detected by the tracking unit 702.

This embodiment is an apparatus for implementing each of the aforesaid embodiments, and specific implementation steps thereof are the same as those in the first embodiment to the third embodiment, so they will not be further described herein.

As compared to the prior art, this embodiment provides an apparatus, which makes control of rotation of the 3D holographic object in the display interface more convenient and faster by activating tracking of human eyes of a user through detecting an open/close state of eyelids of the user, and controlling a 3D holographic virtual object presented in the display interface to rotate in response to the motions of the eyeballs of the user.

Furthermore, it is apparent to those skilled in the art, the present disclosure also provides a display controlling apparatus based on human-eye tracking, which comprises a non-transitory program storage medium and a processor. The non-transitory program storage medium stores a program executed by the processor to perform the method as described in above. Furthermore, it is apparent to those skilled in the art that, various units 701~704 as shown in FIG. 7 are software modules. In another aspect, it is well-known that various software modules inherently are stored in the non-transitory program storage medium and executed by the processor.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A three-dimensional (3D) holographic virtual object display controlling method based on human-eye tracking, comprising the following steps of:
   activating tracking of human eyes of a user;
   tracking motions of eyeballs of the user;
   controlling a 3D holographic virtual object presented in a display interface to rotate in response to the motions of the eyeballs of the user; and
   ending up the tracking of the human eyes of the user;
   wherein the step of tracking motions of eyeballs of the user comprises:
      acquiring a human-face image of the user;
      identifying human-eye regions on the human-face image;
      identifying a sclerotic region and an iris region in each of the human-eye regions according to the color contrast; and
      tracking eyeball motions of the user according to changes in position of the iris region relative to the human-eye region;
   wherein the step of identifying a sclerotic region and an iris region in each of the human-eye regions according to the color contrast, further comprises:
      determining a center connection line of centers of the iris region of the left eye and the iris region of the right eye of the user;
   the step of controlling a 3D holographic virtual object presented in a display interface to rotate in response to the motions of the eyeballs of the user comprises:
      rotating the 3D holographic virtual object about a rotation axis that is located at a barycenter of the 3D holographic virtual object and perpendicular to the center connection line.

2. The display controlling method of claim 1, wherein the step of activating tracking of human eyes of a user comprises:
   detecting an open/close state of eyelids of the user;
   activating the tracking of human eyes of the user if the open/close state of the eyelids of the user satisfies a first preset state;
   the step of ending up the tracking of the human eyes of the user comprises:
   detecting an open/close state of the eyelids of the user; and
   ending up the tracking of the human eyes of the user if the open/close state of the eyelids of the user satisfies a second preset state.

3. The display controlling method of claim 2, wherein the first preset state and the second preset state are that a closing frequency of the eyelids of the user is higher than respective preset frequency thresholds.

4. The display controlling method of claim 2, wherein the first preset state and the second preset state are respectively at least one of the following: the left eyelid of the user is in the open state while the right eyelid of the user is in a closed state, or the left eyelid of the user is in the closed state while the right eyelid of the user is in the open state.

5. The display controlling method of claim 1, wherein the step of tracking motions of eyeballs of the user comprises:
   counting closing actions of the eyelids of the user during the process of tracking motions of the eyeballs of the user;
   if a close action of the eyelids of the user is a closing action for the first time, then suspending the step of controlling a 3D holographic virtual object presented in a display interface to rotate in response to the motions of the eyeballs of the user, and waiting for returning of the eyeball of the user; and
   if a close action of the eyelid of the user is a closing action for the second time, then restarting the step of controlling a 3D holographic virtual object presented in a display interface to rotate in response to the motions of the eyeballs of the user, and clearing the count value of the closing actions of the eyelids of the user.

6. A display controlling apparatus based on human-eye tracking, wherein the display controlling apparatus comprises a non-transitory program storage medium and a processor, the non-transitory program storage medium stores a program executed by the processor to perform a method which comprises:
   activating tracking of human eyes of a user;
   tracking motions of eyeballs of the user;
   controlling a 3D holographic virtual object presented in a display interface to rotate in response to the motions of the eyeballs of the user; and
   ending up the tracking of the human eyes of the user;
   wherein the step of tracking motions of eyeballs of the user in the method performed by the processor, comprises:
      acquiring a human-face image of the user;
      identifying human-eye regions on the human-face image;
      identifying a sclerotic region and an iris region in each of the human-eye regions according to the color contrast; and
      tracking eyeball motions of the user according to changes in position of the iris region relative to the human-eye region;
   wherein the step of identifying a sclerotic region and an iris region in each of the human-eye regions according to the color contrast, further comprises:
      determining a center connection line of centers of the iris region of the left eye and the iris region of the right eye of the user;
   the step of controlling a 3D holographic virtual object presented in a display interface to rotate in response to the motions of the eyeballs of the user comprises:
      rotating the 3D holographic virtual object about a rotation axis that is located at a barycenter of the 3D holographic virtual object and perpendicular to the center connection line.

7. The display controlling apparatus of claim 6, wherein the step of activating tracking of human eyes of a user in the method performed by the processor, comprises:
   detecting an open/close state of eyelids of the user;
   activating the tracking of human eyes of the user if the open/close state of the eyelids of the user satisfies a first preset state;
   the step of ending up the tracking of the human eyes of the user comprises:
   detecting an open/close state of the eyelids of the user; and ending up the tracking of the human eyes of the user if the open/close state of the eyelids of the user satisfies a second preset state.

8. The display controlling apparatus of claim 7, wherein the first preset state and the second preset state are that a closing frequency of the eyelids of the user is higher than respective preset frequency thresholds.

9. The display controlling apparatus of claim 7, wherein the first preset state and the second preset state are respectively at least one of the following: the left eyelid of the user is in the open state while the right eyelid of the user is in a closed state, or the left eyelid of the user is in the closed state while the right eyelid of the user is in the open state.

10. The display controlling apparatus of claim 6, wherein the step of tracking motions of eyeballs of the user in the method performed by the processor, comprises:
  counting closing actions of the eyelids of the user during the process of tracking motions of the eyeballs of the user;
  if a close action of the eyelids of the user is a closing action for the first time, then suspending the step of controlling a 3D holographic virtual object presented in a display interface to rotate in response to the motions of the eyeballs of the user, and waiting for returning of the eyeball of the user; and
  if a close action of the eyelid of the user is a closing action for the second time, then restarting the step of controlling a 3D holographic virtual object presented in a display interface to rotate in response to the motions of the eyeballs of the user, and clearing the count value of the closing actions of the eyelids of the user.

\* \* \* \* \*